(12) United States Patent
Stevens

(10) Patent No.: US 8,087,530 B2
(45) Date of Patent: Jan. 3, 2012

(54) CONTAINER LID WITH INTEGRALLY MOLDED UTENSIL

(75) Inventor: James P. Stevens, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 1022 days.

(21) Appl. No.: 12/015,680

(22) Filed: Jan. 17, 2008

(65) Prior Publication Data
US 2009/0184120 A1    Jul. 23, 2009

(51) Int. Cl.
*B65D 41/56*    (2006.01)

(52) U.S. Cl. .................. 220/212; 206/541; 220/735

(58) Field of Classification Search ............... 220/212, 220/780, 266, 735; 206/217, 541
See application file for complete search history.

(56) References Cited

U.S. PATENT DOCUMENTS

| | | | |
|---|---|---|---|
| 5,695,084 A | | 12/1997 | Chmela et al. |
| 5,706,974 A | * | 1/1998 | Murdick et al. ............... 220/735 |
| 5,775,531 A | * | 7/1998 | Lowry ........................ 220/212.5 |
| 5,902,276 A | | 5/1999 | Namey, Jr. |
| 6,003,710 A | * | 12/1999 | Huang ........................... 220/212 |
| 6,604,645 B1 | * | 8/2003 | Vaupotic ...................... 220/212 |
| 6,604,646 B2 | | 8/2003 | Torniainen et al. |
| 7,017,774 B2 | | 3/2006 | Haedt |
| D602,775 S | * | 10/2009 | Shale ............................. D9/436 |
| 2003/0029868 A1 | | 2/2003 | Davidov et al. |
| 2003/0192898 A1 | | 10/2003 | Haedt |
| 2004/0094548 A1 | * | 5/2004 | Laveault ....................... 220/212 |
| 2005/0115965 A1 | * | 6/2005 | Gibson ......................... 220/212 |
| 2007/0068892 A1 | | 3/2007 | Kaufman |

FOREIGN PATENT DOCUMENTS

| | | |
|---|---|---|
| JP | 404239454 | 8/1992 |
| JP | 405162763 | 6/1993 |
| JP | 07277356 | 10/1995 |
| JP | 408091416 | 4/1996 |
| JP | 1996091416 | 4/1996 |
| JP | 09309560 | 12/1997 |

* cited by examiner

*Primary Examiner* — J. Gregory Pickett
*Assistant Examiner* — Raven Collins
(74) *Attorney, Agent, or Firm* — Alston & Bird LLP

(57) ABSTRACT

A container closure includes a utensil formed of a first polymer material, and a lid formed of a second polymer material, the utensil being detachably adhered to the lid by a chemical bond between the first and second polymer materials in the absence of any adhesive or bonding agent. A method for making the closure comprises the steps of introducing a quantity of a first polymer material into a mold to form a utensil, transferring the utensil from the first mold into a second mold or structurally modifying the first mold, and introducing a quantity of a second polymer material into the second mold or modified first mold to form a lid in such a manner that the utensil is detachably adhered to the lid by a chemical bond between the first and second polymer materials in the absence of any adhesive or bonding agent.

6 Claims, 3 Drawing Sheets

CONTAINER LID WITH INTEGRALLY MOLDED UTENSIL

BACKGROUND OF THE INVENTION

The present disclosure relates generally to closures for containers, and relates more particularly to a closure for a container holding contents that are removed from the container with the aid of a utensil such as a spoon or scoop, wherein the utensil is provided as a part of the closure.

Containers are often used for products that are most conveniently removed from the container with the aid of a utensil such as a spoon, scoop, fork, or the like. For example, various food products are offered in containers of the single-serving type such that a consumer can eat the food directly from the container. In many cases, the food is of a type that requires the use of a utensil. However, if the consumer is not at home or in another place where there is ready access to a utensil, the consumer may not be able to consume the product. Accordingly, to increase the convenience for the consumer, manufacturers of such food product containers have developed various container designs that have a utensil attached in a removable fashion. For example, it is common to mold a utensil separately from a lid for the container, and then to fasten the utensil to the lid using adhesive or mechanical means for attaching the utensil. This requires additional post-molding steps in the lid manufacturing process.

Another common approach for providing a utensil is to integrally mold a plastic lid and utensil together in such a fashion that the utensil can be detached by breaking small plastic tabs or sprues that connect the utensil to the lid proper. In some cases, the lid and utensil are initially molded such that the utensil projects radially outwardly from an outer edge of the lid, and then the utensil is folded about its attachment tab such that the lid overlies the utensil. The post-molding operation of folding the utensil under the lid represents a complication of the overall manufacturing process.

BRIEF SUMMARY OF THE DISCLOSURE

The present disclosure concerns a container closure having an incorporated utensil, which does not require any post-molding operations in the closure manufacturing process. In accordance with one aspect of the disclosure, a container closure comprises a utensil formed of a first polymer material, and a lid formed of a second polymer material, the utensil being detachably adhered to the lid by a chemical bond between the first and second polymer materials in the absence of any adhesive or bonding agent.

In another aspect, a method for making the closure comprises the steps of introducing a quantity of a first polymer material into a mold to form either a utensil or a lid, and subsequently introducing a quantity of a second polymer material into the same mold (or alternatively into a second mold into which the initially molded part is transferred) to form either a lid or a utensil in such a manner that the utensil is detachably adhered to the lid by a chemical bond between the first and second polymer materials in the absence of any adhesive or bonding agent. Such a "two-shot" molding process can be performed within a single molding press.

In some embodiments, the lid comprises a one-piece integral structure comprising a disk-shaped top panel having an upper surface and a lower surface and an outer peripheral edge, and a rim integrally joined with the outer peripheral edge of the top panel. The utensil is detachably adhered to the lower surface of the top panel.

In some embodiments, the utensil includes a scoop connected to a handle, an upper surface of the scoop being concave, and a portion of the lower surface of the top panel is convex and engages the upper surface of the scoop in a complementary manner. The utensil can be spaced from the rim, such that only the top panel is adhered to the utensil.

The lid and the utensil can be of different colors from each other.

The lid and the utensil can be of different degrees of opacity from each other.

In one embodiment, the lid is sufficiently transparent that the utensil can be seen through the lid. The utensil can be substantially more opaque than the lid.

The second polymer material can be of a different molecular structure from the first polymer material.

The first and second polymer materials can be thermoplastic polymer materials. In the two-shot molding process for making the closure, the first and second polymer materials are heated to a temperature sufficient to render the materials fluid, thus producing a melt stream of each material. The fluid first polymer material is fed into the mold configured to form the first part, and the first polymer material is caused or allowed to solidify sufficiently either to permit the first part to be removed from the first mold and transferred into a second mold, or to permit the mold to be modified such as by moving a portion of the mold to form a space for defining the second part. Generally, the first polymer material in the first mold is cooled to a temperature below a melting point temperature of the material before the first part is removed and transferred or the mold is modified. Then the fluid second polymer material is fed into the second mold configured to form the second part, and the second polymer material is caused or allowed to solidify sufficiently to permit the combined lid and utensil to be removed from the second mold. Generally, the second polymer material in is cooled to a temperature below a melting point temperature of the material before the combined lid and utensil is removed.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
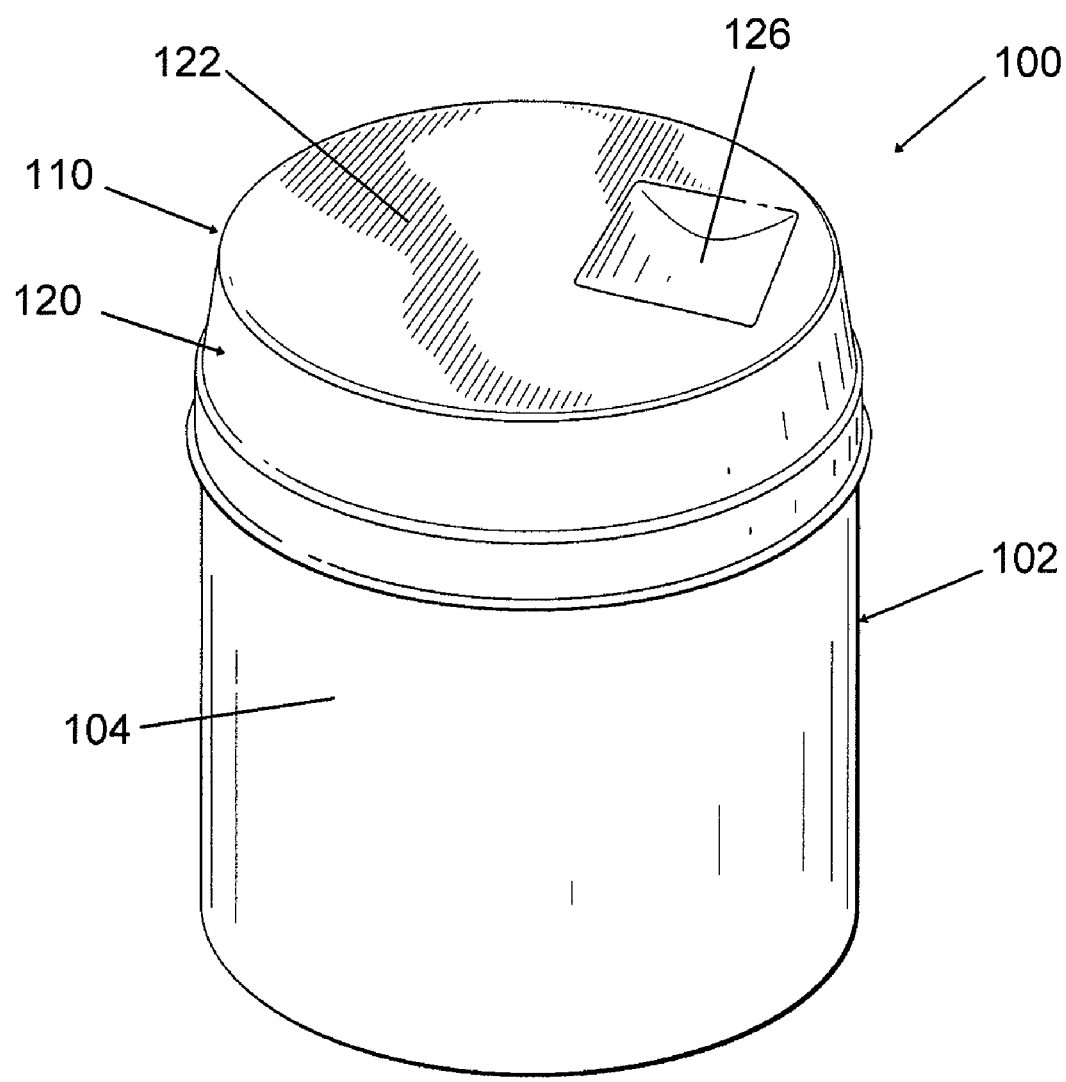
FIG. 1 is a perspective view of a container closed by a closure in accordance with one embodiment of the invention.

A container 100 in accordance with one embodiment of the invention is depicted in FIG. 1. The container has a container body 102 that is configured to hold a quantity of a product such as a food product for consumption directly out of the container body. For example, the food product can be a product conventionally consumed using a spoon or fork or other utensil. The container body 102 can be formed of any suitable material and by any suitable manufacturing process. The container body has a bottom wall (not visible in FIG. 1) and a generally tubular (round, oval, rectangular, conical, etc.) side wall 104 that extends upwardly from the bottom wall and terminates at an upper edge that circumscribes a top opening of the container body. The upper edge (not visible in FIG. 1) can define a bead or flange (not shown) or the like that assists in engaging and retaining the closure in place.

The container 100 further comprises a closure 110 that engages the upper edge of the container body. The closure 110 can constitute the primary closure for hermetically sealing the product in the container, or alternatively can comprise an overcap whose primary function is to cover and protect a flexible membrane lid (not shown) that provides the hermetic sealing function and that is peeled off and discarded after removal of the closure 110.

In containers for products consumed using a utensil, it is convenient for the consumer if the utensil can be provided as part of the container, and various approaches have been proposed for doing so as previously noted. In accordance with the present invention, a utensil is provided as part of the closure in an advantageous manner. For example, in one embodiment illustrated in FIGS. 2 and 3, the closure 110 comprises two parts: a lid 120 and a utensil 130. The lid 120 includes a top panel 122 and a peripheral rim 124 that depends from the top panel at or near an outer peripheral edge thereof. The rim 124 defines structure for engaging the container body to retain the closure in place on the container body. The utensil 130 is detachably engaged with a lower surface of the top panel 122 of the lid 120 such that upon removal of the closure from the container, the utensil can be detached from the lid and used for removing product from the container.

Advantageously, in accordance with the invention, the closure 110 is made of a moldable composition such as a synthetic thermoplastic polymer and is formed in a molding apparatus. More particularly, the closure is formed in a "two-shot" molding operation as described below, the utensil 130 being formed of a first polymer material and the lid 120 being formed of a second polymer material.

Figure 4:
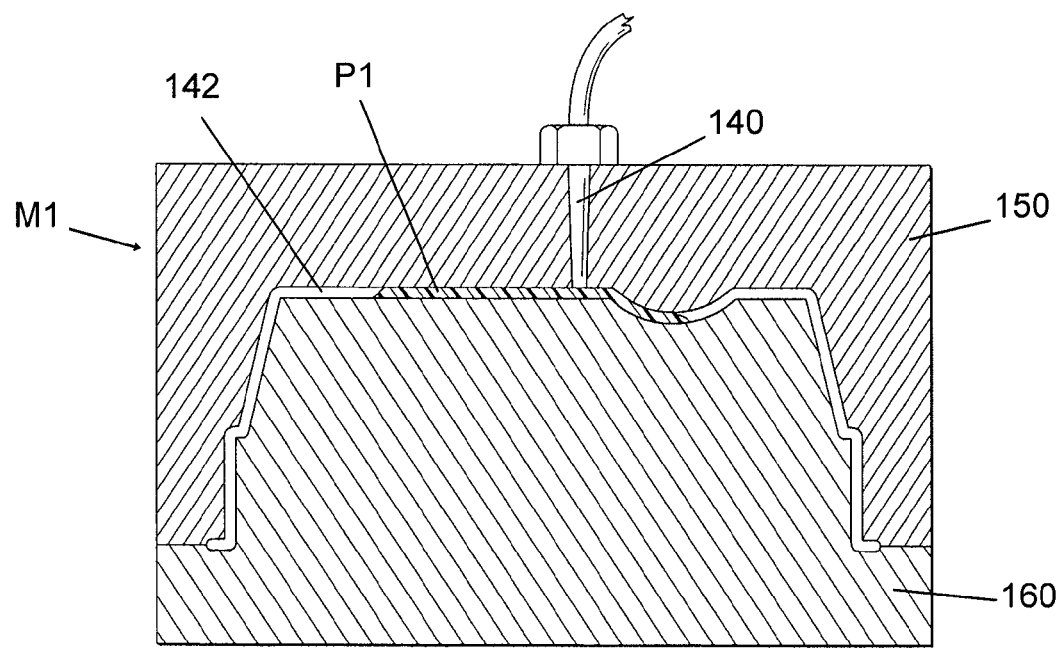
FIG. 4 is cross-sectional view of a first mold, showing a first polymer material filling the mold for forming the lid portion of the closure.
Figure 5:
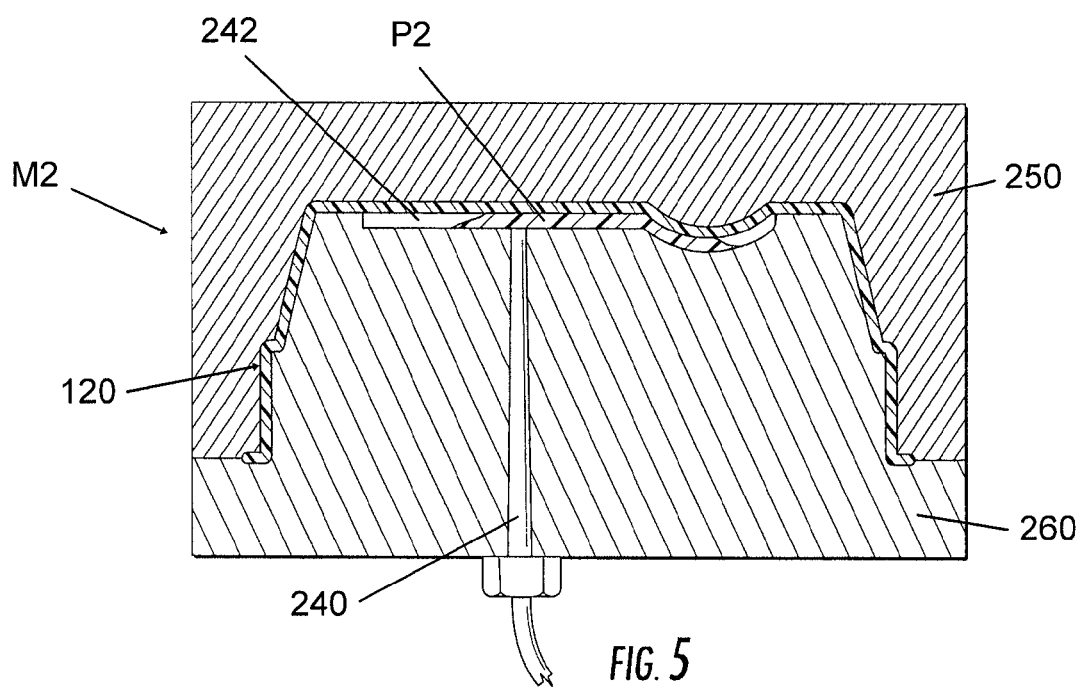
FIG. 5 is a cross-sectional view of a second mold, with the lid disposed in the second mold, and showing a second polymer material injected into the mold to form the utensil.

With reference to FIGS. 4 and 5, a two-shot molding operation in accordance with one embodiment of the invention is illustrated in diagrammatic fashion. The illustrated process is essentially in "overmolding" process that employs two separate molds for respectively forming the utensil and lid. It must be understood, however, that alternatively it is possible to employ a "core back" or "core toggle" process in which the mold is modifiable after the first part is molded. In this technique, the mold has a movable portion that is initially in one position for a first shot molding operation, and is then moved to a new position for a second shot molding operation.

Figure 2:
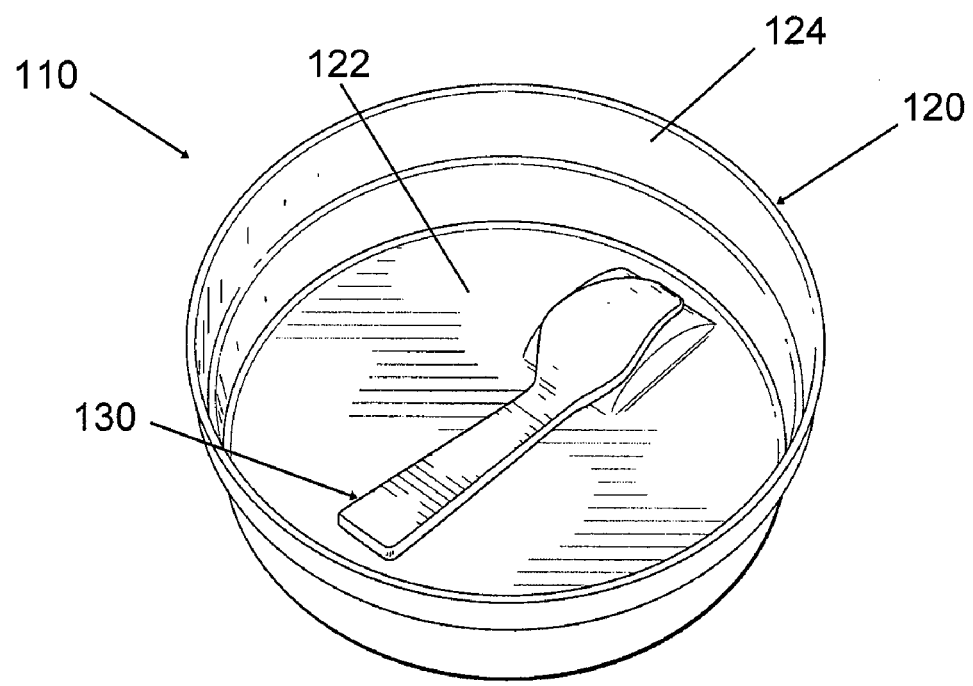
FIG. 2 is perspective view of the closure oriented to reveal the underside of the closure.

With reference to FIGS. 4 and 5, in a first step, a first polymer material P1 in a molten state is injected through an inlet passage 140 of a first mold M1 into a space 142 configured for defining the lid 120 of the closure. The first mold M1 is formed by a top mold half 150 and a bottom mold half 160 that together define the space 142. The first polymer material P1 is injected until the space 142 is entirely filled, and the polymer material is allowed to cool and solidify enough that the mold M1 can be opened and the resulting lid 120 can be transferred into a second mold M2 shown in FIG. 5. The second mold has a top mold half 250 and a bottom mold half 260. The top mold half 250 is configured to engage the lid 120 and position it in a predetermined position with respect to the bottom mold half 260. The bottom mold half 260 cooperates with the lid 120 to define a space 242 configured to form the utensil against the lower surface of the top panel 122 of the lid (FIG. 2). A second polymer material P2 is injected through an inlet passage 240 in the bottom mold half 260 into the space 242 until the space is entirely filled. The utensil thus formed is allowed to cool and solidify enough to permit the lid 120 and utensil 130 to be removed from the second mold as a unit.

In an alternative embodiment (not illustrated), the utensil 130 is initially formed from a first polymer material in a first mold and is transferred to a second mold in which a second polymer material is injected and overmolded onto the utensil to form the lid 120.

Figure 3:
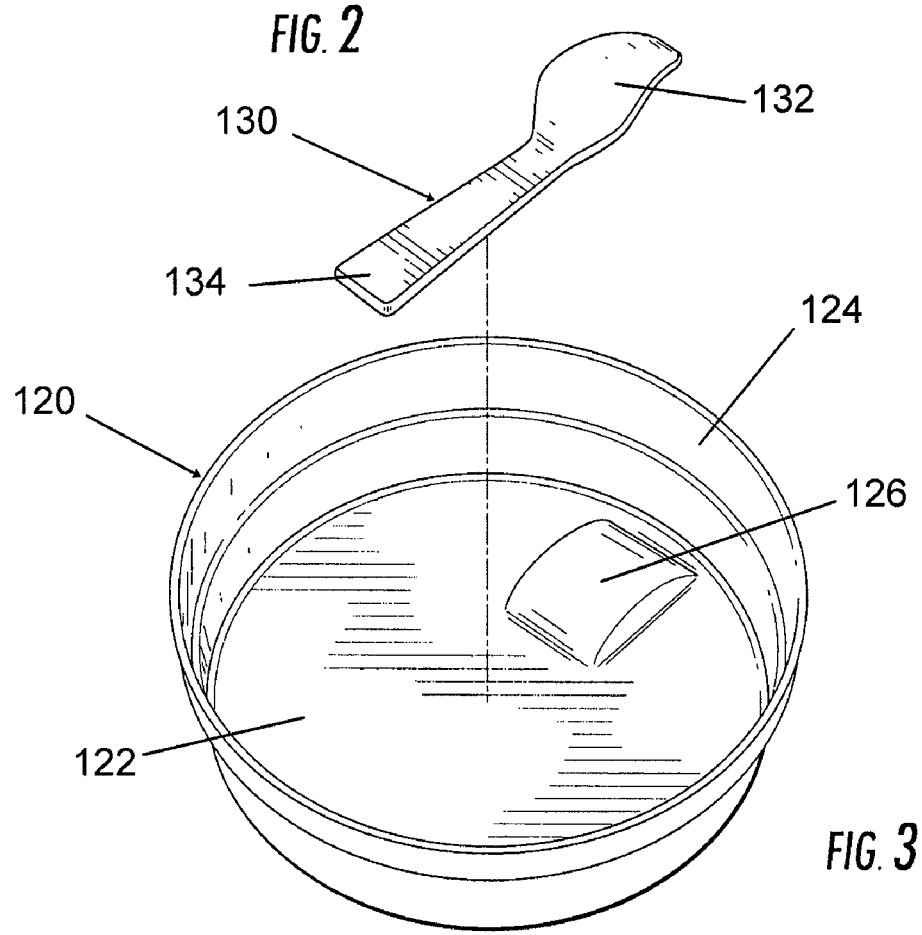
FIG. 3 is a perspective view of the closure with the utensil having been detached from the lid portion of the closure.

In one embodiment as illustrated in FIG. 3, the utensil 130 includes a scoop 132 connected to a handle 134. An upper surface of the scoop is concave. A portion 126 of the lower surface of the top panel 122 is convex and engages the upper surface of the scoop in a complementary manner. The utensil 130 is spaced from the rim 124, such that only the top panel 122 is adhered to the utensil. The invention is not limited to any particular configuration of utensil. The utensil can be a spoon or spoon-like implement, a fork or fork-like implement, a combination spoon/fork or "spork" implement, a pair of chopstick-like implements, or any other desirable type of utensil.

The adhesion of the utensil 130 to the lid 120 is solely via chemical bonding between the first polymer material of the lid and the second polymer material of the utensil. That is, there is no additional adhesive or bonding agent employed between the utensil and the lid, but rather the polymer material of the utensil is in direct contact with and chemically bonds with the polymer material of the lid. In order to allow the utensil to adhere sufficiently to the lid to prevent premature inadvertent detachment and yet be readily detachable by the consumer, the first and second polymer materials are selected to provide the necessary degree of adhesion. In particular, in preferred embodiments the first polymer material is of a different molecular structure from the second polymer material. For example, the first polymer can comprise a first polyolefin and the second polymer can comprise a second polyolefin or a different grade of the first polyolefin. As one non-limiting example, the polymer forming the lid can be a clarified grade of a polyolefin such as clarified polypropylene, while the polymer forming the utensil can be a filled polypropylene or a different polyolefin altogether.

The first and second polymer materials can be selected such that the lid 120 and the utensil 130 are of different colors from each other.

Additionally or alternatively, the lid and the utensil can be of different degrees of opacity from each other. For example, the lid can be sufficiently transparent that the utensil can be seen through the lid, and the utensil can be substantially more opaque than the lid so that it is readily visible through the lid.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A closure for a container, comprising:
   a utensil formed of a first polymer material; and
   a lid formed of a second polymer material, the lid comprising a one-piece integral structure including a disk-shaped top panel having an upper surface and a lower surface and an outer peripheral edge, and a rim integrally joined with the outer peripheral edge of the top panel; wherein the second polymer material is of a different molecular structure from the first polymer material,
   the utensil being detachably adhered to the lower surface of the top panel by a chemical bond between the first and second polymer materials in the absence of any adhesive or bonding agent, wherein the utensil is spaced from the rim, such that only the top panel of the lid is adhered to the utensil.

2. The closure of claim 1, wherein the utensil includes a scoop connected to a handle, an upper surface of the scoop being concave, and wherein a portion of the lower surface of the top panel is convex and engages the upper surface of the scoop in a complementary manner.

3. The closure of claim 1, wherein the lid and the utensil are of different colors from each other.

4. The closure of claim 1, wherein the lid and the utensil are of different degrees of opacity from each other.

5. The closure of claim 4, wherein the lid is sufficiently transparent that the utensil is visible through the lid.

6. The closure of claim 5, wherein the utensil is substantially more opaque than the lid.

* * * * *